(12) United States Patent
Wu (10) Patent No.: US 8,112,185 B2
(45) Date of Patent: Feb. 7, 2012

(54) REMOTE ENGINE START CONFIRMATION AND VEHICLE MONITORING AND CONTROL SYSTEM

(75) Inventor: Anthony M. Wu, Vista, CA (US)

(73) Assignee: DEI Headquarters, Inc., Vista, CA (US)

( * ) Notice: Subject to any disclaimer, the term of this patent is extended or adjusted under 35 U.S.C. 154(b) by 945 days.

(21) Appl. No.: 11/600,368

(22) Filed: Nov. 15, 2006

(65) Prior Publication Data

US 2008/0114501 A1   May 15, 2008

(51) Int. Cl.
*G06F 17/00* (2006.01)
*F02N 11/08* (2006.01)

(52) U.S. Cl. .......... 701/2; 701/1; 701/36; 701/112; 701/113; 123/179.2; 123/179.3; 123/179.4; 123/179.5; 123/179.6; 123/179.12; 123/179.14; 340/426.13; 340/426.14; 340/426.15; 340/426.3; 702/57; 702/60; 702/64; 702/66; 702/75

(58) Field of Classification Search .......... 701/1, 2, 701/29, 36, 99, 112–113; 123/179.2–179.7, 123/179.12–179.15; 340/426.13–426.27, 340/426.3; 702/57, 60, 64, 66, 75
See application file for complete search history.

(56) References Cited

U.S. PATENT DOCUMENTS

| | | | | |
|---|---|---|---|---|
| 5,024,186 A * | 6/1991 | Long et al. | ........... | 123/179.4 |
| 5,349,931 A * | 9/1994 | Gottlieb et al. | ........... | 123/179.2 |
| 5,803,043 A * | 9/1998 | Bayron et al. | ........... | 123/335 |
| 5,874,785 A * | 2/1999 | Liu | ........... | 307/10.5 |
| 5,905,315 A | 5/1999 | Lefebvre et al. | | |
| 5,970,936 A | 10/1999 | Cabrera et al. | | |
| 5,983,850 A | 11/1999 | Vilou | | |
| 6,075,459 A * | 6/2000 | Saarem et al. | ........... | 340/825.69 |
| 6,497,209 B1 * | 12/2002 | Karuppana et al. | ........... | 123/179.3 |
| 6,561,151 B1 | 5/2003 | Wisnia et al. | | |
| 6,918,368 B2 | 7/2005 | Nantz et al. | | |
| 2003/0093192 A1 * | 5/2003 | Chang | ........... | 701/2 |
| 2006/0271247 A1 * | 11/2006 | Matsuura et al. | ........... | 701/2 |

\* cited by examiner

*Primary Examiner* — John Nguyen
*Assistant Examiner* — Chuong Nguyen
(74) *Attorney, Agent, or Firm* — K C Bean, Esq.

(57) ABSTRACT

A remote engine start confirmation and vehicle monitoring and control system includes a transmitter and a controller capable of receiving and processing transmitter signals, the controller comprising a monitoring circuit for detecting a first pulsed voltage pattern and a second pulsed voltage pattern across the battery during an engine start procedure, a signaling circuit for signaling the disengagement of the starter from the engine after a detection of the termination of the first pulsed voltage pattern and the start of the second pulsed voltage pattern, and an initiation circuit for initiating the monitoring of a vehicle condition, such as overheating or low fuel, after the detection. A method for controlling the vehicle operation includes detecting an occurrence of a vehicle condition and performing an operation based on the detection, such as terminating ignition voltage or fuel supply or notifying the operator of the vehicle condition via the transmitter.

16 Claims, 6 Drawing Sheets

REMOTE ENGINE START CONFIRMATION AND VEHICLE MONITORING AND CONTROL SYSTEM

FIELD OF THE INVENTION

The embodiments of the present invention relate generally to vehicular security systems, and, more particularly, to vehicular security systems with remote start functionality.

BACKGROUND

Security systems with remote start functionality are known in the art. These systems generally operate by using a remote transmitter to send a signal to a transceiver within the vehicle to cause the vehicle's engine to start. Remote start functionality is beneficial to a user in that it allows the user to start a vehicle from a distance away from the vehicle, for example within a home or office. Remote start functionality has been particularly useful in areas having colder environments because it allows the user to start the vehicle and warm the vehicle's interior to a comfortable temperature prior to entry. In a similar manner, in warmer environments, remote start capability allows the user to start the vehicle and cool the vehicle's interior to a comfortable temperature prior to entry.

An important feature of remote start systems is determining the proper time required for the starting function to occur, hence the amount of time necessary for the starter to attempt to start the engine. If the starter attempts to start the engine after the engine has already been started, this can lead to damage of the starter and unnecessary draining of the battery. If the starter does not attempt to start the engine for the proper time, the engine will not be started. Therefore, it is crucial for remote start systems to properly detect when a start has occurred to prevent damage to the starter and draining of the battery.

Different methods to detect when a vehicle has started have been used in security systems with remote start capabilities. Some systems have relied on detecting engine revolutions per minute (RPMs). While this method achieves the desired purpose, there can be a significant delay in the time from when the engine is actually started until the time when the detection occurs and the starter is disengaged from the engine flywheel. Other systems have relied on detecting the output from an alternator/generator. The alternator/generator output passes through a voltage regulator, from which the voltage can be monitored. After an engine has successfully started and is running smoothly, the voltage output should be in the range of 13.6 to 14 Volts. When the detection circuit detects a voltage within this range, the starter is then disengaged from the engine flywheel. The drawback of remote start systems using this type of detection circuit is that certain vehicles, such as those with engines that do not perform optimally, may be started, but may not produce a voltage output from the alternator/generator that falls within the 13.6 to 14 Volt range for a certain period of time. Therefore, there exists the possibility that the starter will continue to attempt to start the vehicle's engine after the engine has already been started, thus shortening the life of the starter and causing unnecessary drain on the vehicle's battery.

Another important feature associated with remote start security systems is the ability to start a vehicle from a far away distance. Recent advances in technology have allowed transmitters to start vehicles from up to one mile away. Advantages of remote starting from far distances include the ability to have one's vehicle engine fully warmed to operating temperature as well as to allow a heater or air conditioner to either heat or cool the vehicle's interior to a desired temperature prior to the owner entering the vehicle. One drawback of security systems with far-ranging remote start capabilities is the lack of awareness a vehicle owner has over the operation of their vehicle from the time the vehicle is remotely started until the time the user enters the vehicle. In circumstances where a vehicle owner remotely starts their vehicle from a mile away, the time it takes for the vehicle owner to reach the vehicle can be up to ten minutes, possibly longer. During the period the owner is traveling to their vehicle, various undesirable conditions that may have been prevented if the owner were present in the vehicle, may occur, such as the vehicle engine overheating, the engine or other related drive components may malfunction, or the vehicle may run out of fuel. Current security systems do not provide capabilities to monitor and control vehicle performance after an engine has been remotely started, or to notify a vehicle owner after an undesirable condition has occurred.

Therefore, it would be advantageous to provide a security system with remote start functionality that can provide confirmation of when a vehicle's engine has been started without encompassing any of the drawbacks of the prior art systems. It would also be advantageous to provide a security system with remote start functionality that can provide a vehicle owner with notification when an undesirable vehicle condition, such as engine overheating, has occurred.

SUMMARY

The preferred embodiment of the invention provides a remote engine start confirmation and vehicle monitoring and control system for use in a vehicle having a battery, a starter, and an engine having a flywheel attached thereto, the system including a transmitter and a controller, the controller including a pulse monitoring circuit for detecting a first pulsed voltage pattern and a second pulsed voltage pattern across the resistance of the battery during an engine start procedure, the second pulsed voltage pattern having a higher frequency than the first pulsed voltage pattern, a signaling circuit for signaling the disengagement of the starter from the flywheel after a detection of the termination of the first pulsed voltage pattern and the start of the second pulsed voltage pattern, and an initiation circuit for initiating the monitoring of a vehicle condition after the detection of the termination of the first pulsed voltage pattern and the start of the second pulsed voltage pattern. When a user remotely starts the vehicle engine by use of the transmitter, the monitoring circuit detects a first pulsed voltage pattern. The first pulsed voltage pattern, having a lower frequency than the second pulsed voltage pattern, is caused by the additional resistance produced by the engine during the compression sequence during a starting operation, which causes the starter to draw more power from the vehicle battery. After the engine is started, the second rotation of the started engine will rotate the starter and the pulses at the battery terminals during the remote start sequence will change from lower frequency to higher frequency, creating a second pulsed voltage pattern. The signaling circuit then sends a signal to disengage the starter from the flywheel. At this time, the initiation circuit initiates the monitoring of a vehicle condition.

The vehicle conditions monitored can include, but are not limited to, engine temperature, fuel level, and engine revolutions per minute. If the vehicle condition monitored is engine temperature, the means for initiating the monitoring of an engine condition after the detection of the termination of the first pulsed voltage pattern and the start of the second pulsed voltage pattern is a processor operatively connected to a vehicle temperature sensor. If the engine condition monitored is fuel level, the means for initiating the monitoring of a vehicle condition after the detection of the termination of the first pulsed voltage pattern and the start of the second pulsed voltage pattern is a processor operatively connected to a vehicle fuel sensor. If the vehicle condition is engine revolutions per minute, the means for initiating the monitoring of an engine condition after the detection of the termination of the first pulsed voltage pattern and the start of the second pulsed voltage pattern is a processor operatively connected to a vehicle tachometer. The system can also monitor other inputs that relate to various events such as ignition key input, brake system input, hood input, door input, and trunk input.

Another embodiment of the invention provides a remote engine start confirmation and vehicle monitoring and control system for use in a vehicle having a battery, a fuel pump, an ignition, a starter, a safety system, a comfort system, and an engine having a flywheel attached thereto, the system including a transmitter and a controller, the controller including a means for initiating an engine start procedure, a pulse monitoring circuit for detecting a first pulsed voltage pattern and a second pulsed voltage pattern across the resistance of the battery during an engine start procedure, the second pulsed voltage pattern having a higher frequency than the first pulsed voltage pattern, a signaling circuit for signaling the disengagement of the starter from the flywheel after a detection of the termination of the first pulsed voltage pattern and the start of the second pulsed voltage pattern, and an initiation circuit for initiating the monitoring of a vehicle condition after the detection of the termination of the first pulsed voltage pattern and the start of the second pulsed voltage pattern. When a user remotely starts the vehicle engine by use of the transmitter, the means for initiating an engine start procedure initiates the engine start procedure, the monitoring circuit detects the termination of the first pulsed voltage pattern and the start of the second pulsed voltage pattern, thus indicating that the engine has been started, then the signaling circuit sends a signal to disengage the starter from the flywheel, and the initiation circuit initiates the monitoring of a vehicle condition.

A method is also provided for controlling the operation of a vehicle having a battery, a starter, and an engine having a flywheel attached thereto, the system including a transmitter and a controller, the method comprising the steps of detecting a first pulsed voltage pattern and a second pulsed voltage pattern across the resistance of the battery during an engine start procedure, the second pulsed voltage pattern having a higher frequency than the first pulsed voltage pattern, signaling the disengagement of the starter from the flywheel after a detection of the termination of the first pulsed voltage pattern and the start of the second pulsed voltage pattern, initiating the monitoring of a vehicle condition after the detection of the termination of the first pulsed voltage pattern and the start of the second pulsed voltage pattern, detecting a vehicle condition, and performing an operation based on the detection of a vehicle condition. The step of detecting a vehicle condition can include the steps of determining a range of stored values associated with a vehicle condition, comparing the range of stored values of the vehicle condition with detected values of the vehicle condition, and determining when the detected values are outside of the range of stored values. The step of determining a range of stored values associated with a vehicle condition can be accomplished by the controller monitoring and recording the values associated with the vehicle condition during operation of the vehicle. The step of performing an operation based on the detection of a vehicle condition can include terminating the operation of the vehicle, which may be accomplished by stopping the fuel supply to the engine or by disabling the ignition. The step of performing an operation based on the detection of a vehicle condition can also include sending a signal to the transmitter to inform a user of the vehicle condition.

The above method can be performed within a vehicle system including a controller, battery, remote transmitter, engine control module, coolant temperature sensor, starter motor, fuel pump, ignition circuit, safety system, and comfort system. The safety system can comprise a window defrost system, an airbag system, a passenger restraint system, a vehicle collision warning system, or similar safety system. The comfort system can include an air conditioning and heating system. The controller can include a processor, a pulse monitoring circuit, a starter enabling means, a fuel pump enabling means, an ignition circuit enabling means, a coolant sensor monitoring circuit, a memory module, and a transceiver. The processor is electrically connected to each of pulse monitoring circuit, starter enabling means, fuel pump enabling means, ignition circuit enabling means, coolant sensor monitoring circuit, memory module, and transceiver. Additionally, the processor can be connected to various vehicle inputs such as the door, trunk, ignition key, brake system, and hood inputs, to allow the system to detect various triggering events related to these inputs. The battery is connected to pulse monitoring circuit, as well as each of coolant temperature sensor, starter motor, fuel pump, and ignition circuit. The engine control module is connected to each of coolant temperature sensor, starter motor, fuel pump, and ignition circuit. The engine control module, coolant temperature sensor, starter motor, fuel pump, and ignition circuit can all comprise standard vehicle components that can differ in features depending on the particular make and model of the vehicle.

These and other features and aspects of the embodiments of the invention will be better understood with reference to the description, drawings, and appended claims.

DETAILED DESCRIPTION OF THE PREFERRED EMBODIMENTS

Reference will now be made in detail to several embodiments of the invention that are illustrated in the accompanying drawings. Wherever possible, same or similar reference numerals are used in the drawings and the description to refer to the same or like parts. The drawings are in a simplified form and are not to precise scale. For purposes of convenience and clarity only, directional terms, such as, top, bottom, left, right, up, down, over, above, below, beneath, rear, and front, may be used with respect to the accompanying drawings. These and similar directional terms should not be construed to limit the scope of the invention in any manner. Furthermore, in descriptions and in claims, "couple," "connect," and similar words with their inflectional morphemes do not necessarily import an immediate or direct connection, but include connections through mediate elements within their meanings.

Figure 1:
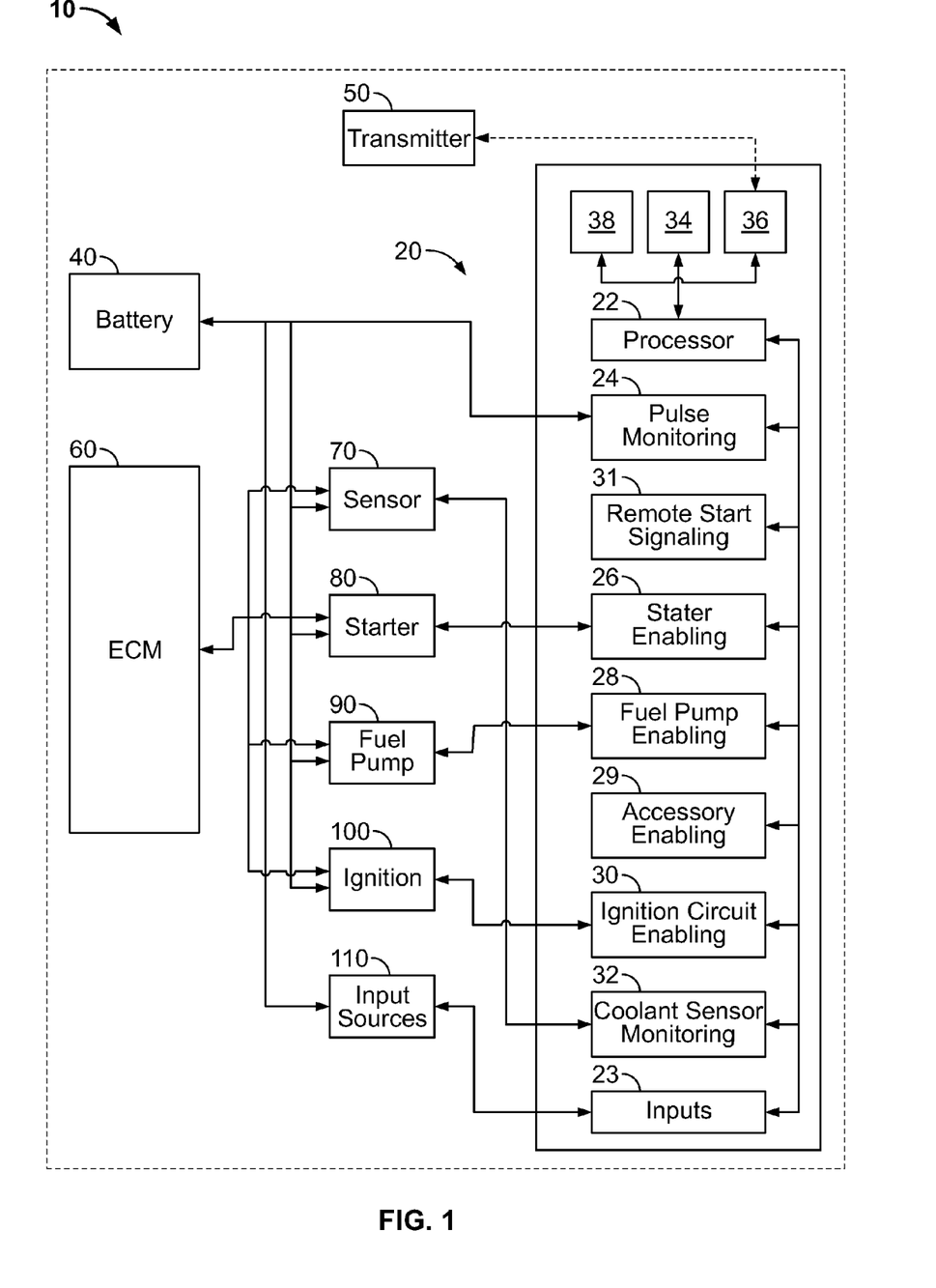
FIG. 1 shows a block diagram of the preferred embodiment of the remote start confirmation and vehicle control system as connected within a vehicle.

Referring more particularly to the drawings, FIG. 1 shows a block diagram of the preferred embodiment of the remote start confirmation and vehicle control system 10 as connected within a vehicle. System 10 includes a controller 20, a battery 40, a transmitter 50, an engine control module 60, sensor 70, a starter motor 80, a fuel pump 90, and an ignition circuit 100, and input sources 110. Controller 20 includes a processor 22, a pulse monitoring circuit 24, a starter enabling means 26, a fuel pump enabling means 28, an ignition circuit enabling means 30, a coolant sensor monitoring circuit 32, memory module 34, transceiver 36, and voltage regulator 38. Processor 22 is electrically electrically connected to each of pulse monitoring circuit 24, starter enabling means 26, fuel pump enabling means 28, ignition circuit enabling means 30, sensor monitoring circuit 32, memory module 34, transceiver 36, and voltage regulator 38. Battery 40 is connected to pulse monitoring circuit 24, as well as each of coolant temperature sensor 70, starter motor 80, fuel pump 90, and ignition circuit 100. Battery 40 is a standard 12V or 24V battery as used in the automobile industry. Engine control module 60 is connected to each of sensor 70, starter motor 80, fuel pump 90, and ignition circuit 100. Engine control module 60 comprises the standard engine control module that is equipped in every vehicle to monitor and control engine conditions. Sensor 70, starter motor 80, fuel pump 90, and ignition circuit 100 all comprise standard vehicle components that can differ in features depending on the particular make and model of the vehicle. Input sources 110 can include an ignition key, the brake light, a hood switch, a door switch, a trunk switch, or other switch as generally used on vehicle security systems.

Processor 22 is a general-purpose, software-driven digital device that can be used for performing many functions of controller 20. Processor 22 can be a microprocessor, microcontroller, or other machine capable of performing binary calculations. Pulse monitoring circuit 24 comprises an alternating current (A/C) signal amplifier circuit that is either part of processor 22 or an independent circuit to provide signal to processor 22. The A/C amplifier circuit is a high gain amplifier circuit that either has an analog or digital design and is used to amplify the higher frequency second pulsed voltage pattern after the termination of the first pulsed voltage pattern. Starter enabling means 26 comprises a processor controller and relay system that is controlled by processor 22. Starter enabling means 26 is preferably serially connected to the input of starter motor 80. Starter enabling means 26 operates to connect starter motor 80 to the positive terminal of battery 40 and to disconnect starter motor 80 at the end of the remote start process. Fuel pump enabling means 28 comprises a processor 22 and relay system to connect one terminal of fuel pump 90 to the positive terminal of battery 40 or to the ground circuit of the vehicle. Ignition circuit enabling means 30 comprises processor 22 and a relay system to activate ignition circuit 100 for internal combustion process to take place during remote engine start process. Sensor monitoring circuit 32 can comprise the vehicle's coolant temperature and fuel level sensors and processor 22 to process the electrical signal of the vehicle's sensors.

Memory module 34 includes instruction code for processor 22 as well as all data detected and processed by processor 22. Memory module 34 can comprise one module or several modules. Memory module 34 can include random access memory (RAM) and read only memory (ROM). The ROM stores the program code executed by processor 22 and the preprogrammed data used by processor 22 in the course of executing the program code. The ROM may include a programmable ROM (PROM) module, an electrically programmable ROM (EPROM) module, and an electrically erasable programmable ROM (EEPROM) module. In some variants, memory module 34 includes an EEPROM device that also stores data received from the other window control system components. The data is thus preserved through interruptions in electrical power and can be retrieved in the future for diagnostic and maintenance purposes. The RAM is a scratch pad memory for storing intermediate results and other temporary data generated by processor 22 in the course of executing the program code. Voltage regulator 38 is a standard regulating device that limits the voltage of the system to 5 Volts.

Transmitter 50 is a portable user hand-held remote control device that allows the operator of system 10 to perform various operations on a vehicle at locations distant from a vehicle. For example, the transmitter 50 may arm and disarm the security system, lock and unlock doors and trunk, sound siren, start engine, and perform other functions when corresponding commands are entered by the user. If the security system is configured so that transmitter transceiver 50 can be used to lock and unlock doors of an automobile, the system effectively becomes a keyless entry device, in addition to performing other functions. Transmitter 50 is configured to communicate with transceiver 36. Transmitter 50 is configured to both send and receive signals from transceiver 36. Transceiver 36 can be configured to communicate with various types of transmitter 50 as disclosed herein and recognized by one with ordinary skill in the art. Transmitter 50 can communicate with transceiver 36 over a communication link that can be a digital bus, analog connection, optical link, radio frequency (RF) link, infrared link, or other wired and wireless connections as would be recognized by one with ordinary skill in the art. Transmitter 50 is not limited to a particular communication range by the scope of this invention. Transmitter 50 can include an alphanumeric display, and pushbutton and scroll wheel input devices to allow the operator of the system 10 to send and receive information such as vehicle status, diagnostic information, maintenance data, and acknowledgement data.

Sensor 70 can comprise various sensors depending on the type of vehicle condition to be monitored. For example, sensor 70 can comprise a coolant temperature sensor to monitor the temperature of the coolant temperature to prevent overheating of the vehicle's engine. Examples of other sensors 70 include, but are not limited to, a fuel pump sensor to monitor vehicle fuel level and an engine RPM sensor to monitor engine revolutions. System 10 is not limited to one sensor 70 connected to processor 22, but can also include several sensors 70, either to monitor the same condition or several different conditions. Sensor monitoring circuit 32 will be configured to communicate with sensor 70, and thus the particular configuration of sensor monitoring circuit 32 will depend on the sensor 70 used in system 10. For example, if sensor 70 is a coolant temperature sensor, sensor monitoring circuit 32 will comprise a coolant temperature sensor monitoring circuit to specifically monitor coolant temperature. However, it is also within the scope of the embodiments of this invention for sensor monitoring circuit 32 to contain circuitry to monitor various vehicle conditions, such as fuel level, coolant temperature, and engine revolutions per minute, such that only one sensor monitoring circuit 32 is needed in system 10, rather than different sensor monitoring circuits 32 for each vehicle condition to be monitored.

In operation, system 10 can be used to provide remote start confirmation and vehicle control capabilities. A user can initiate a remote start procedure by pressing a button on transmitter 50. At this point, transceiver 36 will receive the transmission and forward it to processor 22. Processor 22 will then interpret the command and output a signal to initiate starter enabling means 26, wherein starter enabling means 26 will cause starter motor 80 to engage the flywheel on an engine (not shown) to cause the flywheel to rotate, thus causing the engine crankshaft to rotate the engine pistons to create the internal combustion necessary to start the vehicle. After this occurs, processor 22 will initiate ignition enabling means 30 and fuel pump enabling means 28. It is preferable to initiate starter motor 80, then ignition enabling means 30, then fuel pump enabling means 28 in that particular order to prevent flooding of the cylinders with fuel before there is engine rotation and sparks. This process allows the engine to easily start on the proper air/fuel mixture and prevents difficult starting due to an overly rich air/fuel mixture.

Figure 3:
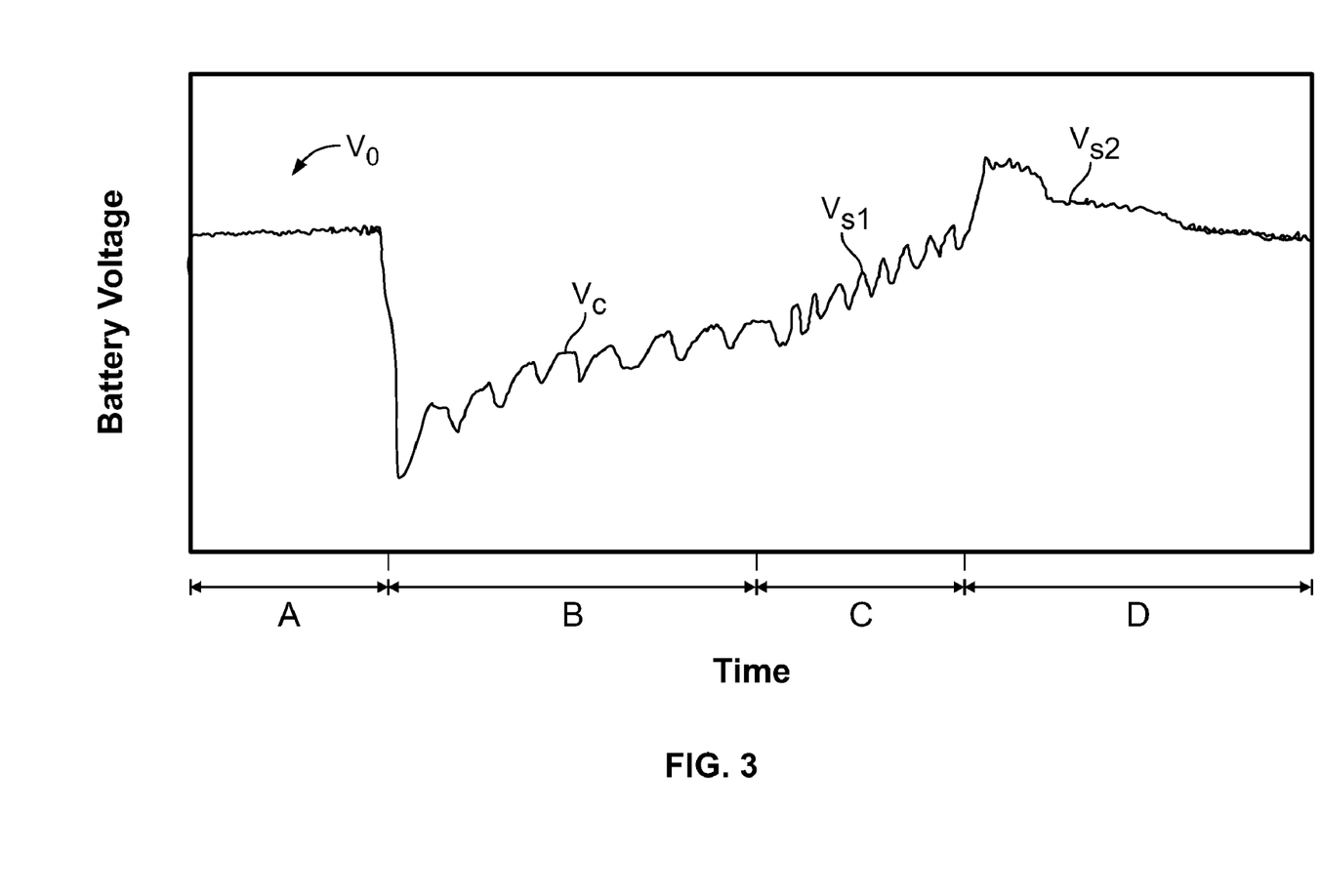
FIG. 3 shows a graph of the battery voltage conditions before, during, and after a remote start engine start procedure.

At this same time processor 22 causes pulse monitoring circuit 24 to initiate the monitoring of the voltage of battery 40. During the starting process, the voltage of battery 40 will vary in a pulsed pattern, as shown in FIG. 3. When pulse monitoring circuit 24 detects the termination of a first pulsed voltage pattern and the start of a second pulsed voltage pattern, the second pulsed voltage pattern having a higher frequency than the first pulsed voltage pattern, a signal will be sent back to processor 22 to disengage starter motor 80 from the flywheel, with processor 22 then sending a signal to starter enabling means 26 to disengage starter motor 80 from the flywheel. At this time, processor 22 will then initiate sensor monitoring circuit 32 to begin the monitoring of a vehicle condition. Upon detection of a vehicle condition, sensor monitoring circuit 32 can output a signal to processor 22, wherein processor 22 can then disable the affected vehicle component. Processor 22 can then notify the operator of the vehicle by causing transceiver 36 to send a signal to transmitter transceiver 50.

Figure 2:
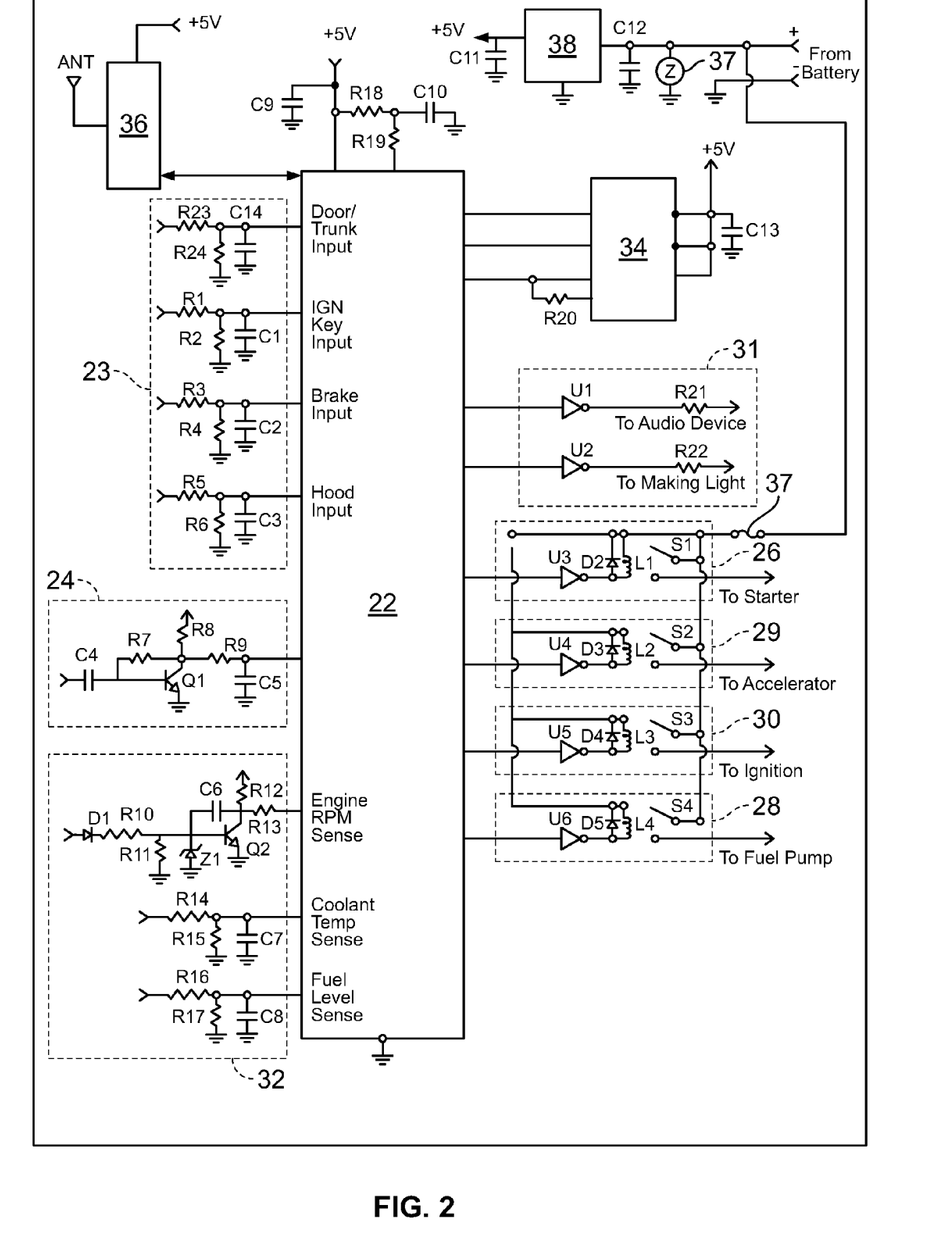
FIG. 2 shows a schematic diagram of the circuitry contained within the controller module.

FIG. 2 shows a schematic diagram of the circuitry contained within controller 20. Controller 20 can include a housing 21 that contains a circuit board containing processor 22, inputs 23, pulse monitoring circuit 24, starter enabling means 26, fuel pump enabling means 28, ignition circuit enabling means 30, remote starting signaling outputs 31, sensor monitoring circuit 32, memory 34, transmitter 36, and voltage regulator 38. As shown, inputs 23 include inputs from input sources 110. More or less inputs 23 can be included within controller 20 depending on the number of input sources 110 and the particular characteristics of the vehicle and system 10. Such additional inputs 23 can be similar in configuration as to the inputs shown. Inputs 23 contain resistors R1-R6, with R1, R3, and R5 preferably having a resistance of 4.7 kΩ and R2, R4, and R6 preferably having a resistance of 3 kΩ. Inputs 23 also contain capacitors C1-C3 each having a capacitance of 0.1 µF. Controller 20 can also include a capacitor C9 connected to processor 22 for helping to prevent self-oscillation of processor 22. Controller 20 can further include a power up reset circuit comprised of a capacitor C10 and resistors R18 and R19, which is used to provide a short time delay to rest processor 22 after power is applied to processor 22.

Memory 34, preferably an EEPROM module, receives a +5V input and is connected to processor 22 via circuitry that includes a resistor R20 and a capacitor C13. Transmitter 36 also receives a +5V input and is connected directly to processor 22 such that signals can readily flow between transceiver 36 and processor 22. Voltage regulator 38 serves to regulate the voltage level to 5V or DC voltage levels the system 20 requires. Circuitry relating to voltage regulator 38 includes capacitor C11 with a capacitance of 10 µF, capacitance C12 with a capacitance of 0.1 µF, and a 27V surge protector 37 that protects the circuitry from surging battery voltage. Processor 20 contains circuitry connected thereto for the described function in this disclosure for remote start confirmation and engine monitoring functions, the circuitry receiving an input of +5V and including capacitor C9 with a capacitance of 0.1 µF, resistor R18 with a resistance of 10 kΩ, resistor R19 with a resistance of 1 kΩ, and capacitor C10 with a capacitance of 0.1 µF. Pulse monitoring circuit 24 can be a digital or analog amplifying circuit. Pulse monitoring circuit 24 includes resistor R7 with a resistance of 750 kΩ, resistor R8 with a resistance of 15 kΩ, and resistor R9 with a resistance of 2 kΩ. Circuit 24 also includes capacitor C4 with a capacitance of 0.22 µF and capacitor C5 with a capacitance of 0.1 µF. Circuit 24 further includes a transistor Q1.

As shown, sensor monitoring circuit 32 includes three sensing circuits—an engine RPM sensing circuit, a coolant temperature sensing circuit, and a fuel level sensing circuit. However, sensor monitoring circuit 32 can comprise more or less circuitry as required by the particular characteristics of the vehicle and system 10. For example, sensor monitoring circuit 32 can also contain a battery level sensing circuit, an oil level sensing circuit, or ambiance temperature sensing of any enclosed area of a vehicle. In an embodiment of the invention suited for commercial vehicle applications, the temperature sensing means can sense the temperature of an enclosed area for cargo if the temperature is too high or too low for the type of product that being transported. The alert signal can be sent to the operator/driver to notify them of the condition and to remote start the vehicle to either heat or cool the enclosed area to the temperature that is acceptable for the type of goods being transported. The engine RPM sensing circuit contained within sensor monitoring circuit 32 includes resistors R10-R13, with R10 having a resistance of 5.1 kΩ, R11 having a resistance of 20 kΩ, R12 having a resistance of 7.5 kΩ, and R13 having a resistance of 10 kΩ. RPM sensing circuit can also contain a diode D1, a zener diode D2, a transistor Q2, and a capacitor C6. Coolant temperature sensing circuit contains a resistor R14 with a resistance of 4.7 kΩ, resistor R15 with a resistance of 3 kΩ, and capacitor C7 with a capacitance of 0.1 ΩF. Fuel level sensing circuit can include a resistor R16 with a resistance of 4.7 kΩ, resistor R17 with a resistance of 3 kΩ, and capacitor C8 with a capacitance of 0.1 µF.

Remote starting signaling output 31 can include various outputs to serve remote start related functions. For example, as shown, remote starting signaling output 31 includes an output to an audio device and another output to a parking light relay to alert a user that the remote start process has been initiated and there after the vehicle has remotely started. The audio device output can include an operational amplifier U1 and a resistor R21 having a resistance of 21Ω. The parking light relay output can include an operational amplifier U2 and a resistor R22 having a resistance of 21 Ω.

Starter enabling means 26 is preferably a relay that allows a signal to be sent to starter motor 80 to start the vehicle. Starter enabling means 26 can include an operational amplifier U3 connected to a diode D2 and an inductor L1, with a switch S1 connected thereto, such that inductor L1 can control whether or not switch S1 is opened or closed. Accelerator accessories enabling means 29 is also preferably a relay that allows a signal to be sent to one or more of the accelerator accessories, such as the air conditioner, heater, window defroster, interior lights, dome light, etc. . . . , to ready the vehicle to be driven in a safe and comfortable condition. Accelerator accessories enabling means 29 can include an operational amplifier U4 connected to a diode D3 and an inductor L2, with a switch S2 connected thereto, such that inductor L2 can control whether or not switch S2 is opened or closed. Ignition circuit enabling means 30 is also preferably a relay that allows a signal to be sent to the ignition circuit to allow the ignition to be energized to allow starting. Ignition circuit enabling means 30 can include an operational amplifier U5 connected to a diode D4 and an inductor L3, with a switch S3 connected thereto, such that inductor L3 can control whether or not switch S3 is opened or closed. Fuel pump enabling means 28 is also preferably a relay that allows a signal to be sent to the fuel pump to allow the operation of the vehicle's engine. Fuel pump enabling means 28 can include an operational amplifier U6 connected to a diode D5 and an inductor L4, with a switch S4 connected thereto, such that inductor L4 can control whether or not switch S4 is opened or closed.

FIG. 3 shows a graph of the voltage of battery 40 before, during, and after a remote start engine start procedure. The x-axis of the graph represents the time elapsed during the start procedure, with reference A denoting the time before the engine start procedure, reference B denoting the time during the engine start procedure, reference C denoting the time between when the engine is started and the voltage of battery 40 spikes due to the input voltage received from the vehicle alternator, and reference D denoting the time after the engine start procedure wherein the voltage of battery 40 initially spikes due to the input voltage from the vehicle alternator, then returns normal operating voltage. During time period A, the voltage of battery 40 is denoted by reference value Vo, which represents a constant voltage. During time period B, the cranking of the engine by the starter motor, the voltage of battery 40 is a first pulsed voltage pattern denoted by reference value Vc. During time period C, in the early stage of a vehicle start, a second pulsed voltage pattern of battery 40 is denoted by reference value $Vs_1$. During time period D, in the latter stage of a vehicle start, the voltage of battery 40 is denoted by reference value $Vs_2$. Time period A is a variable time period depending on when the engine start command is received. The duration of time period B and time period C ranges from anywhere between 0.60 s to 0.80 s. The duration of time period D can range from 0.50 s to 0.80 s.

When a user presses a button on transmitter 50 to initiate an engine start procedure, voltage Vo experiences a substantial drop and then begins a first pulsed voltage pattern as shown by Vc. During time period B, starter motor 80 draws more power from battery 40 during the compression sequence of the pistons of the vehicle engine, causing the first pulsed voltage pattern Vc to have a certain frequency. (Thereafter, the application of the ignition circuit enabling means 30 and fuel pump enabling means 28 will complete the needed requirement for the rotation engine to start). After the engine is started, the second rotation of the engine will outpace the slower rotation of starter motor 80. Thus, the battery voltage after starting, denoted as $Vs_1$, exhibits a second pulsed voltage pattern that has a higher frequency than the first pulsed voltage pattern Vc. During time period D, the voltage of battery 40, denoted as $Vs_2$, will first spike as a result of the influx of voltage from the vehicle alternator, then will lower to the normal operating voltage of battery 40.

Figure 4:
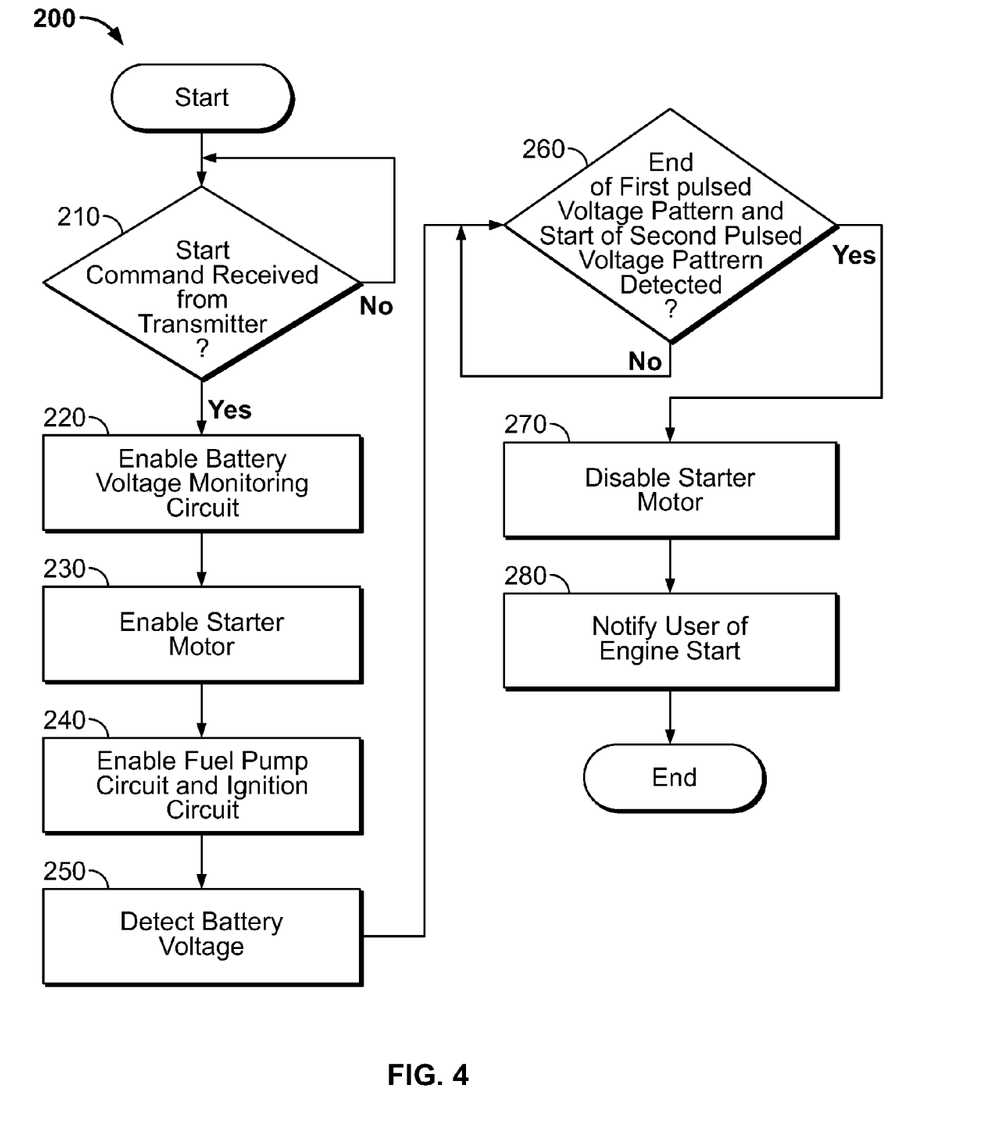
FIG. 4 shows a flow diagram of method for confirming the starting of a vehicle using the preferred embodiment of the remote start confirmation and vehicle control system as connected within a vehicle.

FIG. 4 shows a flow diagram of method 200 for confirming the starting of a vehicle using the preferred embodiment of the remote start confirmation and vehicle control system as connected within a vehicle. Method 200 begins at step 210 with determining if a start command has been received from the remote transmitter (not shown). If no start command has been received, the method starts over. If a start command has been received, step 240 involves enabling the starter motor. Step 230 next involves enabling the battery pulse voltage detection circuit. Thereafter, step 220 includes enabling the fuel pump circuit and the ignition circuit. Step 250 next involves detecting the battery voltage. Step 260 involves determining whether the end of the pulsed voltage pattern has been detected. If the end of the first pulsed voltage pattern is not detected, step 260 repeats. If the end of the first pulsed voltage pattern is detected and the start of the second pulsed voltage is detected, step 270 involves disabling the starter motor. Next, step 280 involves notifying the user that the engine has been started. After step 280, method 200 is terminated. Method 200 can be performed within a vehicle system such as system 10 illustrated in FIG. 1 and described herein.

For illustration purposes, method 200 will be described with respect to being performed within system 10. Method 200 begins at step 210 with determining if a start command has been received from the remote transmitter. This step can be accomplished by processor 22 determining whether transceiver 36 has received a command from transmitter 50. This step may involve processor 22 checking a registry in memory (not shown) in transceiver 36. If a start command has not been received, method 200 starts over. If a start command has been received, step 220 involves enabling the battery pulse voltage monitoring circuit. This step can be performed by processor 22 outputting a voltage signal to pulse monitoring circuit 24. Step 230 next involves enabling the starter motor. This step can be performed by processor 22 outputting a voltage signal to starter enabling means 26. Step 240 includes enabling the fuel pump circuit and the ignition circuit. This step can be performed by processor 22 outputting a voltage signal to fuel pump enabling means 28 and ignition circuit enabling means 30 to enable fuel pump 90 and ignition circuit 100 respectively. Processor 22 preferably enables the fuel pump circuit and the ignition circuit approximately 100 milliseconds after processor 22 outputs a voltage signal to starter enabling means 26. After the fuel pump circuit and ignition circuit have been enabled, the vehicle engine will start within approximately 20 milliseconds.

Step 250 next involves detecting the battery pulsed voltage patterns. This step is performed by pulse monitoring circuit 24. Step 260 involves determining whether the end of the first pulsed voltage pattern and the start of a second pulsed voltage pattern has been detected. To accomplish this step, pulse monitoring circuit 24 can compare the detected battery voltage pattern to voltage patterns stored within pulsed monitoring circuit 24. Alternatively, pulse monitoring circuit 24 can send detected voltage patterns to processor 22, and processor 22 can perform a comparison of the detected pattern with voltage pattern values stored in memory module 34. If the end of the first pulsed voltage pattern and the start of the second pulsed voltage pattern is not detected, step 260 repeats. If the end of the first pulsed voltage pattern is detected and the start of a second pulsed voltage pattern is detected, step 270 involves disabling the starter motor. When pulse monitoring circuit 24 detects the change of these first and second pulsed patterns, it will then send a voltage signal to processor 22 to disengage starter motor 80 from the engine flywheel. Processor 22 then sends a signal to starter enabling means 26 to disengage starter motor 80 from the engine flywheel. Next, step 280 involves notifying the user that the engine has been started. This step can be accomplished by processor 22 causing transceiver 36 to output a signal to transmitter 50. After step 280, method 200 is terminated.

Figure 5:
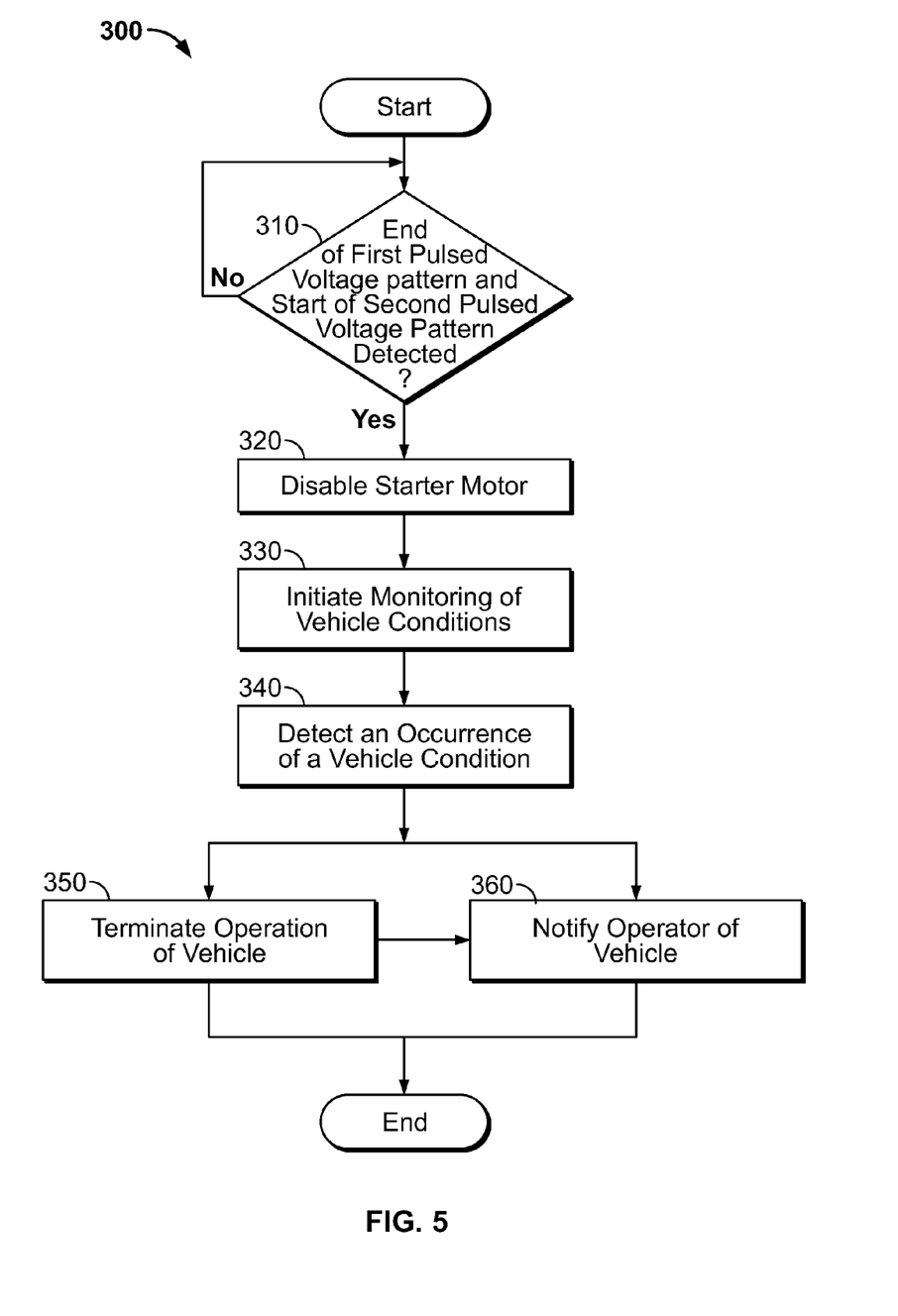
FIG. 5 shows a flow diagram of method for controlling the operation of a vehicle using the preferred embodiment of the remote start confirmation and vehicle control system as connected within a vehicle.

FIG. 5 shows a flow diagram of method 300 for controlling the operation of a vehicle using the preferred embodiment of the remote start confirmation and vehicle control system as connected within a vehicle. Method 300 begins at step 310 with determining whether the end of the first pulsed voltage pattern and the start of the second pulsed voltage pattern have been detected. If not, step 310 starts over. If so, step 320 involves disabling starter motor 80. Next, step 330 involves the initiation of the monitoring of the vehicle's conditions. Step 340 involves detecting an occurrence of a vehicle condition. At this juncture, method 300 can either proceed with step 350 to terminate operation of the vehicle or method 300 can proceed with step 360 to notify the operator of the vehicle of the detection of an occurrence of a vehicle condition. If method 300 proceeds to step 350, upon the completion of step 350 method 300 can proceed to step 360. After step 360, method 300 is terminated.

For illustration purposes, method 300 will be described with respect to the detection of an occurrence of a vehicle having a low fuel level, wherein method 300 is performed within system 10. Method 300 begins at step 310 with determining whether the end of the first pulsed voltage pattern and the start of the second pulsed voltage have been detected. Step 310 can be performed similar to step 260 described above. If the end of the first pulsed voltage pattern and the start of the second pulsed voltage pattern have not been detected, step 310 starts over. If the change from the first pulsed voltage pattern to the second pulsed voltage pattern has been detected, step 320 involves disabling starter motor 80. This step can be performed similar to step 270 as described above.

Next, step 330 involves the initiation of the monitoring of the vehicle's conditions. This step can be accomplished by processor 22 outputting a voltage signal to sensor monitoring circuit 32. Next, step 340 involves detecting an occurrence of a vehicle condition. This step can be performed by processor 22 as set forth in the discussion of FIG. 6 below. Once an occurrence of a vehicle condition has been detected, method 300 can either proceed with step 350 to terminate operation of the vehicle, method 300 can proceed with step 360 to notify the operator of the vehicle of the detection of an occurrence of a vehicle condition, or method 300 can proceed to step 370 to perform an operation such as activating an audio or visual indicator. If method 300 proceeds to step 350, upon the completion of step 350 method 300 can proceed to step 360. At step 350, processor 22 can terminate the operation of the vehicle by sending a voltage signal to either fuel pump enabling means 28 to disable fuel pump 90 or ignition circuit enabling means 30 to disable ignition circuit 100. Step 360 can be accomplished by processor 22 causing transceiver 36 to output a signal to transmitter 50. Step 360 can also involve causing processor 22 to perform an operation such as sending a signal to activate the at least one of vehicle's lights, including interior lights and headlights, the vehicle's horn, or both the lights and horn, to provide an audible and/or visual warning to the vehicle owner of an occurrence of an event. After step 360, method 300 terminates.

Figure 6:
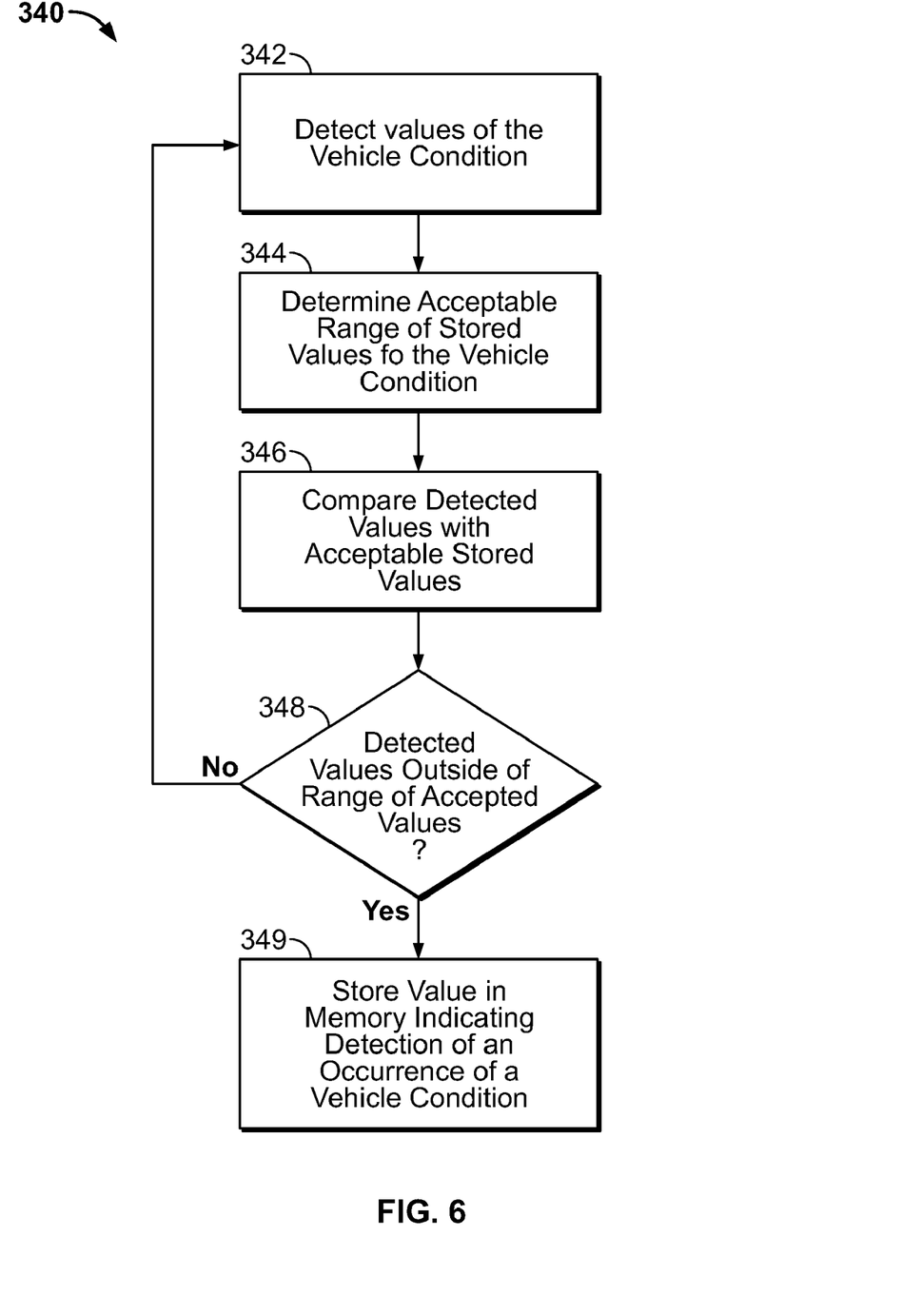
FIG. 6 shows a flow diagram of the step of detecting an occurrence of a vehicle condition using the preferred embodiment of the remote start confirmation and vehicle control system as connected within a vehicle.

FIG. 6 shows a flow diagram of step 340. Step 340 includes step 342 of detecting values of the vehicle condition. Step 344 involves determining an acceptable range of stored values of the vehicle condition. Step 346 involves comparing the detected values with acceptable stored values. Step 348 involves determining whether the detected values fall outside of the range of accepted stored values. If not, step 340 starts over at step 342. If so, step 349 shows that an occurrence of a vehicle condition has been detected.

For illustration purposes, step 340 will be described with respect to the detection of an occurrence of a vehicle having a low fuel level, wherein method 300 is performed within system 10. Step 342 involves the detection of the current value of the vehicle condition, in this case, the current fuel level. This step can be accomplished by processor 22 obtaining the value of sensor 70 from sensor monitoring circuit 32 and storing the value in memory module 34. Step 344 next involves determining the acceptable stored values for the fuel level. This step can be accomplished by processor 22 retrieving the acceptable fuel level values from memory module 34. Next, step 346 involves comparing the detected fuel value with the acceptable fuel level values. This step can be accomplished by processor 22 performing a comparison logic function on the two values. Step 348 next involves determining whether the detected fuel level value falls outside of the range of acceptable fuel level values. This step can be accomplished by processor 22 as a result of the comparison performed in step 346. If the fuel level value is not outside of the ranged of acceptable fuel level values, step 340 starts over at step 342. If the fuel level value is outside of the range of acceptable fuel level values, step 340 proceeds to step 349, wherein processor 22 can store a value in memory 34 to indicate that a vehicle condition has been detected, confirming the detection of an occurrence of a vehicle condition.

This document describes the inventive devices and methods for remote start confirmation and monitoring of a vehicle. This is done for illustration purposes only. Neither the specific embodiments of the invention as a whole, nor those of its features limit the general principles underlying the invention. The invention is not limited to automotive uses. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is served by the claims and their equivalents.

I claim:

1. A remote engine starter, confirmation and vehicle monitoring and control system for use in a vehicle having a battery, a starter, and an engine having a flywheel attached thereto, the system including a transmitter and a controller capable of receiving and processing signals from the transmitter, the controller comprising:
 a) a monitoring circuit configured to detect a first pulsed voltage pattern and a second pulsed voltage pattern across the resistance of the battery during an engine start procedure, the second pulsed voltage pattern having a higher frequency than the first pulsed voltage pattern;
 b) a signaling circuit configured to signal the disengagement of the starter from the flywheel after a detection of the termination of the first pulsed voltage pattern and the start of the second pulsed voltage pattern; and
 c) an initiation circuit configured to initiate the monitoring of a vehicle condition after the detection of the termination of the first pulsed voltage pattern and the start of the second pulsed voltage pattern whereby when the monitoring circuit configured to detect the termination of the first pulsed voltage pattern and the start of the second pulsed voltage pattern indicating that the engine has been started, then the signaling circuit configured to sends a signal to disengage the starter from the flywheel and the initiation circuit configured to initiate the monitoring of a vehicle condition.

2. A method for confirming the starting of a vehicle having a battery, a starter, and an engine having a flywheel attached thereto, the system including a transmitter and a controller, the method comprising the steps of:
 a) detecting a first pulsed voltage pattern and a second pulsed voltage pattern across the resistance of the battery during an engine start procedure, the second pulsed voltage pattern having a higher frequency than the first pulsed voltage pattern; and
 b) signaling the disengagement of the starter from the flywheel after a detection of the termination of the first pulsed voltage pattern and the start of the second pulsed voltage pattern.

3. The method for confirming the starting of a vehicle of claim 2 further comprising the step of notifying the user that the engine has been started.

4. The method for confirming the starting of a vehicle of claim 3, wherein the step of notifying the user that the engine has been started includes the step of sending a signal to a transmitter.

5. A method for remotely starting and monitoring and controlling the operation of a vehicle having a battery, an ignition, a starter, and an engine having a flywheel attached thereto, the system including a transmitter and a controller capable of receiving and processing signals from the transmitter, the method comprising the steps of:
 a) initiating a remote engine start procedure;
 b) detecting a first pulsed voltage pattern and a second pulsed voltage pattern across the resistance of the battery during the engine start procedure, the second pulsed voltage pattern having a higher frequency than the first pulsed voltage pattern;
 c) signaling the disengagement of the starter from the flywheel after a detection of the termination of the first pulsed voltage pattern and the start of the second pulsed voltage pattern;
 d) initiating the monitoring of a vehicle condition after the detection of the termination of the first pulsed voltage pattern and the start of the second pulsed voltage pattern;
 e) detecting an occurrence of a vehicle condition; and
 f) performing an operation based on the detection of an occurrence of a vehicle condition.

6. The method for monitoring and controlling the operation of a vehicle of claim 5, wherein the step of initiating a remote engine start procedure comprises the steps of:
 a) enabling the starter motor
 b) enabling the ignition; and
 c) enabling the fuel pump.

7. The method for monitoring and controlling the operation of a vehicle of claim 5, wherein the step of detecting an occurrence of a vehicle condition comprises the steps of:
 a) detecting values of the vehicle condition;
 b) determining a range of acceptable stored values associated with the vehicle condition;
 c) comparing the range of acceptable stored values of the vehicle condition with the detected values of the vehicle condition; and
 d) determining when the detected values are outside of the range of acceptable stored values.

8. The method for monitoring and controlling the operation of a vehicle of claim 7, wherein the step of determining a range of acceptable stored values associated with a vehicle condition is accomplished by the controller monitoring and recording the values associated with the vehicle condition during normal operation of the vehicle.

9. The method for monitoring and controlling the operation of a vehicle of claim 5, wherein the step of performing an operation based on the detection of a vehicle condition includes terminating the operation of the vehicle.

10. The method for monitoring and controlling the operation of a vehicle of claim 9, wherein the step of terminating the operation of the vehicle includes stopping the fuel supply and to the engine.

11. The method for monitoring and controlling the operation of a vehicle of claim 9, wherein the step of terminating the operation of the vehicle includes disabling the ignition.

12. The method for monitoring and controlling the operation of a vehicle of claim 5, wherein the step of performing an operation based on the detection of a vehicle condition includes sending a signal to the transmitter to inform a user of the occurrence of a vehicle condition.

13. The method for monitoring and controlling the operation of a vehicle of claim 5, wherein the step of performing an operation based on the detection of a vehicle condition includes activating an audio indicator.

14. The method for monitoring and controlling the operation of a vehicle of claim 13, wherein the audio indicator is a vehicle horn or siren.

15. The method for monitoring and controlling the operation of a vehicle of claim 5, wherein the step of performing an operation based on the detection of a vehicle condition includes activating a visual indicator.

16. The method for monitoring and controlling the operation of a vehicle of claim 13, wherein the visual indicator is at least one light of the vehicle.

* * * * *